2,986,540

ORGANIC PLASTIC MATERIALS MADE FROM VULCANIZED OILS AND THEIR PREPARATION

Karl W. Posnansky, Stamford, Conn., assignor to Stamford Rubber Supply Company, Stamford, Conn.

No Drawing. Filed Aug. 1, 1958, Ser. No. 752,434

20 Claims. (Cl. 260—18)

This invention relates to new organic plastic materials of good physical strength, good surface characteristics, superior chemical and solvent resistance and high dielectric strength. The invention includes organic plastic materials made from vulcanized unsaturated fatty acid esters and their method of preparation. More specifically, it relates to compounds prepared from vulcanized unsaturated fatty acid esters and the di- and polyisocyanates, and is a continuation-in-part of my copending application Serial No. 455,785, filed September 13, 1954, now abandoned.

The vulcanization of unsaturated fatty acid esters by mixing them with sulphur or other vulcanizing agents and subjecting them to heat for variable lengths of time according to the characteristics desired is well known. The product obtained by vulcanization of unsaturated fatty acid esters may be either a viscous liquid, a soft gel or an elastic solid. All of these products are known as "hot vulcanized oils." Conversely the vulcanization process may take place with sulphur chloride at room temperature or under cooling. When sulphur chloride is used as a vulcanizing agent, at low temperatures, the products obtained are known as "cold vulcanized oils." Vulcanization may also be effected in the presence of solvents, and the end product of the "hot vulcanized" process can be placed in solution according to the method disclosed in my United States Patent No. 2,523,446. These vulcanized oils (vulcanized unsaturated fatty acid esters) are extensively used in rubber compounding to impart specific characteristics to the rubber.

Vulcanization brings about a sulfide cross linking of the fatty acid esters of which the oils is composed at the double bond of the acid chains, thereby causing the formation of large three-dimensional molecules. The formation of these large molecules manifests itself typically by thickening or solidifying of the oil. Vulcanized oils, whether made by the hot or the cold process, comprise the starting materials used in the process of making my new plastic material.

The use of the di- or polyisocyanates as polymerizing agents is also well known. For example the reaction of the diisocyanates with glycols to form polyurethanes is the basis of a series of fibers which resemble nylon in their properties. Di- and polyisocyanates have also been used to prepare adhesives for cementing nylon and rayon to rubber and rubber to plastic and metal. m-Tolylene diisocyanate has been used with the alkyd resins to produce foamed plastics.

The use of diisocyanate or polyisocyanate as a polymerizing agent is principally useful because of the reaction of the isocyanate radical with an active hydrogen. The reaction between the isocyanate and a reactive hydroxyl group is known, especially in organic qualitative analysis. The latter reaction is used to prepare solid derivatives of alcohols and amines. Diisocyanates will react with an organic compound having hydroxyl groups to form polyurethane bridges between the molecules of the hydroxyl-containing compound. This polymerization by the formation of cross-linking bridges results in the formation of very large organic molecules. A substance composed of these very large molecules may be either a very viscous liquid or may solidify depending on the degree of cross linking.

Castor oil, which is largely composed of the glyceride of ricinoleic acid, can be treated with the di- or polyisocyanates to form cross-linked polymers since ricinoleic acid contains an active hydroxyl group and the acid glyceride is already a fairly large molecule. However, when organic polymers are prepared from unmodified castor oil with an amount of diisocyanate sufficient to react all the hydroxyl groups, the product formed is a soft substance of comparatively low tensile strength. This is especially true when the product is applied in thin layers, thus making it unsatisfactory for coatings. This indicates that the cross linking which takes place with the equivalent amount of diisocyanate is not sufficient to convert the castor oil into a hard substance. I have discovered that if the castor oil, or any other hydroxyl-containing unsaturated fatty acid ester, is first vulcanized to form sulfide cross-linking bridges between the molecules and then these larger molecules are treated with an amount of the di- or polyisocyanates necessary to react all the hydroxyl groups, a product will be formed which, in relation to products made by reacting the same esters with di- or polyisocyanate without the prevulcanization step, is dry, hard, and of comparatively high tensile strength while remaining flexible.

I have also discovered that a product having great utility in the coating and plastic arts may be prepared by vulcanizing castor oil or any other hydroxyl-containing unsaturated fatty acid ester in the presence of other vulcanizable unsaturated materials and then reacting these co-vulcanizates with an amount of the di- or polyisocyanates necessary to react the hydroxyl groups.

The hydroxyl-containing unsaturated fatty acid esters include esters wherein the hydroxyl group is on the fatty acid chain, esters wherein the hydroxyl group is on the residue of a polyhydric alcohol (polyhydric alcohol partial esters of non-hydroxyl containing unsaturated fatty acids), esters wherein the hydroxyl group is on both, mixed esters wherein some of the fatty acids contain hydroxyl groups and others do not, and artificially hydroxylated esters.

The above processes may be carried out with more or less than the stoichiometric amount of di- or polyisocyanate to produce useful products of varying properties. In those instances where less than the equivalent quantity of the isocyanate is used, solid products of varying properties will be obtained, but if the same quantity of the isocyanate is used without prevulcanization, the resulting product will be a liquid or a soft product of limited or no utility. Even in those instances where an excess of the isocyanate is used a much harder product will be finally obtained than that obtained with the same amount of isocyanate without prevulcanization. It will be seen that the gist of my discovery is that vulcanizable unsaturated hydroxyl-containing fatty acid esters may be vulcanized either alone or with other unsaturated compounds and thereafter reacted with di- or polyisocyanates to produce a wide variety of plastic materials suitable for coating, molding, spotting, laminating and the like.

Accordingly, one object of the present invention is to provide an organic cross-linked polymer made from vulcanized oils of the castor oil group reacted with the di- or polyisocyanates and a method of making the same. It is an object of this invention to provide an organic polymeric material from the reaction of an unsaturated hydroxyl-containing fatty acid ester including vulcanizate with a di- or polyisocyanate. An additional object of this invention is to provide polymeric compounds from the reaction of a di- or polyisocyanate with the vulcanizate of a polyhydric alcohol partially esterified with an unsaturated fatty acid.

It is still another object of this invention to provide compounds prepared by the reaction of a di- or polyisocyanate with a vulcanizate of an unsaturated vulcanizable compound and either the partial ester of a polyhydroxyl compound and an unsaturated fatty acid or an unsaturated fatty acid ester containing hydroxyl groups in the fatty acid radical. Another object of this invention is to provide compounds prepared from synthetic castor oil substitutes and the di- or polyisocyanates. Another object of this invention is to provide organic plastic materials made from vulcanized esters of ricinoleic acid, reacted with the di- or polyisocyanates. A further object of this invention is to provide a method of preparing these compounds in the form of films or sheets. A further object is to provide a coating material made from vulcanized oils. A still further object of this invention is to provide a method of preparing these compounds in the form of molded solids. Still another object of this invention is to provide a method of preparing these compounds in the form of foams. Other objects of this invention will in part be obvious and will in part appear hereinafter.

The invention accordingly comprises the several steps and the relation of one or more of such steps with respect to each of the others, and the composition possessing the features, properties, and the relation of constituents which are exemplified in the following detailed disclosure, and the scope of the invention will be indicated in the claims.

In general I have used the following method to prepare these new plastic materials. The first step is to vulcanize either naturally occurring castor oil, an oil of the castor oil group, a synthetic oil used as a castor oil substitute, a polyhydric alcohol partially esterified with an unsaturated fatty acid, or any one of these compounds in the presence of an unsaturated vulcanizable material. This vulcanization may be carried out by either the "hot method" or "cold method" and may be done either directly or in solution. The resulting vulcanized oil is then treated with one of the di- or polyisocyanates such as m-tolylene diisocyanate, or triphenyl methane triisocyanate. The physical form of products depends upon the extent to which the oil is vulcanized, whether the oil is in solution or a solid prior to being treated with the di- or polyisocyanate, and the kind and amount of di- or polyisocyanate used. If the oil is fully vulcanized, after treatment with an amount of di- or polyisocyanate necessary to react all hydroxyl groups it will in general outwardly resemble the original product in appearance. However, it will be considerably harder and dryer than the original product. A powder of treated fully vulcanized oil may be used to form a coherent plastic product if it is filled into molds and subjected to pressure. If the fully vulcanized oil is in solution prior to treatment, the compound formed by treating the solution with a similar amount of di- or polyisocyanate can be cast into sheets of films and used as a coating or dipping compound. If the oil is semi-vulcanized before treatment, it will be a viscous liquid, or a soft gel which can be re-liquified by the application of heat. The semi-vulcanized oils after being mixed with the di- or polyisocyanate will remain liquid for a limited time. Thus, before setting they may be poured into molds to form molded articles before the reaction has proceeded to the point of solidification. They may also be used for pouring thicker sheets or plates than can be obtained from fully vulcanized solutions, or they may be diluted with solvents and used as coating or dipping compositions in this form. The partially vulcanized oils as well as the dissolved or solvent diluted fully vulcanized oils can be foamed before setting either mechanically or by foam-causing additives.

The general class of materials which may be used for starting materials include hydroxy, vulcanizably unsaturated compounds, and their mixtures with other vulcanizably unsaturated compounds which may be incorporated as modifiers. Specifically, these starting materials include the esters of chemically unsaturated hydroxyl-containing acids, the polyhydric partial esters of unsaturated fatty acids, and mixtures thereof with vulcanizably unsaturated modifiers. In general, these chemically unsaturated hydroxyl-containing acid esters may be either naturally occurring, as in the case of castor oil or they may be synthesized from naturally occurring products. They must be unsaturated in order that they may be vulcanized, and it is necessary that at least one of the starting materials contain the hydroxyl group or equivalent in order that they will react with the di- or polyisocyanates to form large molecules.

More specifically, the starting materials may be either castor oil, which is a naturally occurring glyceride of ricinoleic acid or modified castor oil. Ricinoleic acid has both unsaturated linkages (iodine No. 80–90) and hydroxyl groups (acetyl value approximately 150). Other natural oils of the castor oil group including, for example, grape oil may also be used. Another source of raw material is chemically hydroxylated unsaturated fatty oils, such as hydroxylated soyabean oil, and hydroxylated fish oil. In addition to these hydroxyl-containing oils, synthetic esters of ricinoleic acid may be made from the polyhydric alcohols. Esters made from glycol, pentaerythritol, sorbitol or other polyhydric alcohols can be used as the raw materials. In fact, it is not even necessary to form the esters from ricinoleic acid, since chemically hydroxylated unsaturated fatty acids may also be esterified with a polyhydric alcohol to form the starting material or suitable esters may be obtained by interesterification between hydroxyl containing and non-hydroxyl containing fatty acid esters.

It is also not necessary that the hydroxyl group be contributed to the starting compound from the fatty acid residue. An unsaturated fatty acid partial ester of a polyhydric alcohol furnishes a hydroxy unsaturated starting material wherein the hydroxyl group is present on the polyhydric alcohol residue of the unsaturated fatty ester. Thus, the use of hydroxyl-containing unsaturated fatty acid derived materials is unnecessary. Specific examples of such starting compounds are the mono- and diglycerides of tall oil fatty acids and the transesterification product of linseed oil and an excess of polyhydric alcohol.

In general, the polyhydroxy alcohol residues of these partial esters may be derived from polyols exemplified by ethylene glycol; di-, tri- or polyethylene glycol; diols of propane, butane, pentane, and hexane; glycerol; hexane triol; trimethylol ethane; and mannitol. The unsaturated fatty acyl portion of the partial ester may include, for example, the following acids: hexenoic, heptenic, heptenoic, octenoic, nonenoic, decenoic, undecenoic, lauroleic, myristoleic, palmitoleic, oleic, erucic, linoleic, linolenic, eleostearic, licanic, arachidonic, clupanadonic, and mixtures thereof. There must be in each such ester at least one unesterified hydroxyl group.

Other starting materials which can only be used in combination with the above starting materials and may thus be termed modifiers include unsaturated vulcanizable materials. Among these materials are unsaturated fatty acid esters, unsaturated rosin and polymerized unsaturated rosin esters, synthetic high molecular weight poly-unsaturated petroleum resins, synthetic rubber forming polymers including butadiene-acrylonitrile copolymers, butadiene-styrene copolymers and polysulfide polymers. Examples of unsaturated fatty acid esters are linseed oil, soya bean oil, fish oil, synthetic esters of tall oil fatty acids with one or more polyhydric alcohols such as glycerol or pentaerythritol, alkyd type esters (made from unsaturated fatty acids and phthalic anhydride with polyhydric alcohols), unsaturated polyesters prepared from dimerized fatty acids (Emery Industries) and diadded to the mixture of vulcanized oil and organic solvent. If proper proportions of solvent and basic nitrogenous substance are employed the whole mixture will be converted to a uniform gel which after a short space of time will liquify to a clear solution containing the vulcanized oil in dissolved form. This may be mixed directly with the desired amount of di- or polyisocyanate. Since certain of the isocyanates are solids at room temperature, it is necessary to put these in solution with solvents such as toluol or benzene in order to mix them with the vulcanized oil, or alternatively, heat can be applied to the reaction mixture sufficient to assure uniform distribution of the solid isocyanates in such mixture. Such application of heat is necessary in the case of blocked isocyanates which are only reactive at temperatures sufficiently high to remove the blocking effect, and to thereby insure the reaction. These temperatures are usually in excess of 140° C.

According to my present information, the method described above for placing vulcanizates in solution will only work where the material has been hot vulcanized. Where the material is to be cold vulcanized, the vulcanization itself, that is the mixing of the material with sulphur chloride, can be performed in the presence of a solvent resulting in a dissolved or solvent diluted vulcanizate. The di- or polyisocyanate can be mixed with this solution directly.

The mixing of the di- or polyisocyanate with a semi-vulcanizate is very simple. In general, a semi-vulcanizate will be a liquid, but if it is in solid form, it is only necessary to heat it and convert it to a liquid. When this is done, the isocyanate can be mixed directly with the vulcanizate. Solvents or diluents can be used if desirable for the particular application to be made of the solution.

The reaction between the vulcanizate and unblocked di- or polyisocyanate, mixed by the methods described above will take place at room temperature. However, the reaction may be speeded up by heating. Heating is also often desirable to completely remove a solvent when solutions of vulcanizates of one of the di- or polyisocyanates or both are used. The presence of moisture while possibly having an influence on the speed and completion of the reaction, does not at this stage appear necessary. Pigments, plasticizers, catalysts, driers, accelerators, or modifiers of various well known types can be added during any stage of or after vulcanization. Catalysts may be especially desirable in carrying out the isocyanate reaction. The above mentioned additives may be added at any time before the final setting of the products.

The physical form of the products of this invention is determined to a large extent by the nature and composition of the vulcanizable starting materials. Also the physical form of the products made from these new plastics, apart from the composition of the starting materials, is determined by the degree of vulcanization and upon the type and amount of di- or polyisocyanate used. Thus if a comminuted full vulcanizate of castor oil is treated with di- or polyisocyanates as described above, the resulting vulcanized powder will be considerably harder and drier than the original powder but will still outwardly resemble the original product. However, it has a much lower acetone soluble portion (3% as compared to 18%) and much less acetone soluble sulphur (0.2% as compared to 1.5%). If this very hard, dry powder is used in rubber compounding, the rubber produced will be very hard and much less flexible than that compounded from a vulcanizate which has not been treated with an isocyanate. Rubbers of this sort are desirable in certain applications. The treated vulcanized powder can also be filled into molds and subjected to pressure. This will cause it to fuse together to a coherent hard plastic product in the shape of the mold. The molding process may take place in the presence of heat and moisture. The resulting product has strength and hardness as compared to very low tensile strength and softness in the product not treated with isocyanate. If the fully vulcanized material is in solution, the reaction product formed after treating it with one of the polyisocyanates can be cast into sheets or films or used as a coating or dipping compound. The film or coating thus obtained will be considerably stronger, harder and more mechanical and solvent resistant than the film made from ordinary vulcanized oil. At the same time, it will retain the desirable flexibility of vulcanized oil films. The above described films are fairly resistant to aging and ultraviolet light. They have very high dielectric strength, sheets of 5 mils thickness having dielectric strengths of 2300 volts per mil. For purposes of comparison, certain butyl rubber sheets of approximately the same thickness have dielectric strengths slightly in excess of a thousand volts per mil.

The non-solvent containing semi-vulcanized materials can be poured without being diluted with solvents. Thus solid molded products can be formed from a liquid semi-vulcanized material treated with di- or polyisocyanate by pouring the liquid into molds before the reaction has proceeded to the point of solidification. This method also may be useful for pouring thicker sheets or plates than can be obtained from solutions of the fully vulcanized material. Again, by varying the amount of di- or polyisocyanate added to the vulcanizate, either tacky films or dry flexible films of varying hardness and objects may be obtained. The tacky films are useful as adhesives.

The semi-vulcanized materials can also be made into water dispersions and mixed with dispersions of phenol blocked isocyanates (Hylene MT). After evaporation of the water, the reaction can then be brought about by heating to approximately 150° C. to form a film, useful for coating and laminating purposes.

Foams may be prepared of this plastic material from either partially or fully vulcanized solutions. This is accomplished by either mechanically foaming a liquid mixture of vulcanizate and di- or polyisocyanates or by adding foam-causing materials before setting. One foam-causing additive which may be used is a small amount of water.

My invention is illustrated by the following examples to which, however, it is not limited. The parts are by weight unless otherwise specified.

*Example I*

A fully hot vulcanized castor oil, which is a solid elastic product, is ground into a fine powder; 13, 19.5 and 26 parts of m-tolylene diisocyanate acid are added per 100 parts of the oil. These amounts are thoroughly mixed with separate batches of the oil and represent 50%, 75% and 100% of the theoretical amount of m-tolylene diisocyanate required for complete reaction of all the oil hydroxyl groups.

After letting the mixture stand for approximately 12 hours at room temperature, or for 1 or 2 hours at 80° C., the treated vulcanized oil powder is found to be much harder and drier, the 100% treated oil being the dryest. When extracted with acetone, the latter product shows an acetone extract of 3% compared with 18–20% for the untreated vulcanized oil. The acetone soluble sulphur has been reduced from 1.5–2% in the untreated material to .2% in the treated material.

If a small amount of water is mixed into the ground vulcanized oil, it seems to aid the reaction.

*Example II*

The mechanical mixture of vulcanized oil and diisocyanate prepared as in the previous example, is pressed into a platen mold under 3,000 pounds per square inch pressure, heated shortly and removed from the press. A solid sheet of clear, hard plastic material results.

If a small amount of water is mixed into the ground ethylene glycol, and the like. Examples of suitable unsaturated rosin and unsaturated polymerized rosin esters include, respectively, a diethylene glycol ester of rosin, namely Flexalyn (Hercules Powder) and an ethylene glycol ester of polymerized rosin, namely Polypale Ester No. 1 (Hercules Powder). Unsaturated petroleum polymerizates (polymeric olefinic hydrocarbon resins obtained by the polymerization of unsaturated alicyclic fractions of petroleum) which can be used may be exemplified by CTLA polymer (aromatic type olefinic hydrocarbon from Enjay Co.), Ethyl Corporation's Hydropolymer Oil, Velsicol E.L. (Velsicol Chemical Corp.), Shell's Dutrex 20, and the like. Examples of other vulcanizable modifiers which may be incorporated in the vulcanizate are Hycar 1312 from Goodrich Chemical Co. (a liquid butadiene-acrylonitrile copolymer), liquid GRS (butadiene-styrene co-polymer), and Thiokol LP2 (liquid polysulfide rubber polymer from Thiokol Rubber Co.).

The starting materials are first vulcanized by the well known processes which have been mentioned above. In general, vulcanization comprises heating the starting materials with sulphur or sulphur compounds, either alone or in the presence of accelerators, activators, or modifiers. By this method, according to the degree of vulcanization, liquid viscous products or more or less solid elastic products can be produced. The former are known as partially or semi-vulcanized oils while the latter, which are substantially completely vulcanized, are often referred to as rubber substitutes. These rubber substitutes are mostly added to rubber, during its processing in order to impart specific properties to it such as softness, or to prevent sagging or extruded goods made from rubber stock during curing. In addition to hot vulcanizing, the oils may be cold vulcanized by mixing sulphur chloride with the oil at room temperature or under cooling. In either case, depending upon the amount of sulphur or sulphur compounds used, the length of time the vulcanization process is allowed to continue, and other reaction conditions, the resulting product will be a viscous liquid, a soft gel or an elastic solid. Fully vulcanized oils are either gels or elastic solids, whereas partially vulcanized oils are either viscous liquids or gels. The distinction between these two products is that the fully vulcanized oil gel will not re-liquify upon the application of heat, whereas the partially or semi-vulcanized oil gel will re-liquify when heat is applied.

The effect of vulcanization on the original oil molecules or other starting materials is to bring about a sulfide cross-linking at the double bonds. This causes the formation of large three dimensional molecules and the formation of these molecules manifests itself as previously mentioned by a typical thickening or solidifying effect. However, this does not appreciably effect the hydroxyl group which is attached to the fatty acid esters. The vulcanized oil is next treated with one of the organic di- or polyisocyanates, for example, m-tolylene diisocyanate, diethylmethane diisocyanate, 3,3-dimethyl-4,4-diphenylene diisocyanate, 3,3-dimethoxy-4,4-diphenylene diisocyanate, 2,3-dimethyltetramethylene diisocyanate, 2-chlorotrimethylene diisocyanate, trimethyl methane triisocyanate, dianisidine diisocyanate, Carwin Company's PAPI (polyaryl polyisocyanate), DuPont's Hylene MP (a bisphenol adduct of methylene-bis - 4 - phenyl isocyanate), and Mobay's Mondur CB-60 (a solution of the reaction product of trimethylol propane and tolylene diisocyanate). The di- or polyisocyanate reacts with the hydroxyl groups to form a polyurethane. The result is additional cross linking at the hydroxyl group of the sulphur linked fatty acid esters. Thus the molecule, besides containing the original ester linkage, now contains both sulphur linkages and urethane linkages and is consequently a large molecule reinforced type of vulcanized oil.

The amount of isocyanate needed for treating vulcanized oil can be calculated from the number of hydroxyl groups in a given amount of vulcanized oil and the number of isocyanate groups per molecular weight of the organic polyisocyanate. I have found, for example, that to each 100 parts by weight of vulcanized oil approximately 26 parts by weight of tolylene diisocyanate should be added to completely polymerize the vulcanized oil. Similarly, to each 100 parts of vulcanized oil approximately 37 parts by weight of diphenyl methane diisocyanate or triphenyl methane triisocyanate should be added to react all the hydroxyl groups. The amount of di- or polyisocyanate which is added may, however, be varied above or below these figures. If the amount is less than the amount specified the resulting product will be softer than if the specified amount were used. Similarly, if more than the required amount is used the resulting product may further polymerize and result in an even harder product. In many instances it will be desirable to use more or less than the stoichiometric quantity of isocyanate to provide products having particular properties. As a specific example, there is the instance where a non-gelling isocyanate adduct solution is desired. This can be accomplished by, for instance, co-vulcanizing linseed oil with castor oil in various proportions and reacting the vulcanizate with an excess of tolylene diisocyanate. It will be recognized that where an excess of a polyisocyanate is used, there is the possibility of the isocyanate groups reacting eventually with the previously formed urethane groups to provide allophanate linkages.

In those instances where non-hydroxyl containing unsaturated compounds are first co-vulcanized with hydroxyl-containing unsaturated higher fatty acid esters and the thus formed vulcanizate is reacted with a di-or polyisocyanate, the relation proportion of the ester and the other unsaturated compound may be varied over a wide range depending on the nature of the materials and the desired properties of the end product. The amount of hydroxyl containing unsaturated fatty acid ester will generally be at least about 10% by weight of the mixture before co-vulcanization although it may constitute as little as 5% and it obviously can be used in all higher proportions to 100%.

When using the lesser quantities as 5%–10% of the hydroxy containing esters, hard products will not be immediately obtained. However, such products will generally set comparatively fast, by reason of the isocyanate reaction and, especially, in the event one of the components used in the co-vulcanization has drying properties, will harden thereafter gradually, to a tough hard fiber. The addition of known catalysts or driers such as cobalt naphthenate will accelerate the solidification and hardening.

The organic radical associated with the polyisocyanate also has an effect on the resulting product, as does the number of isocyanate groups present per molecule. I have found, for example, that all other conditions being the same, diphenyl methane diisocyanate will give a harder product than tolylene diisocyanate. Similarly, triphenyl methane diisocyanate will yield an even harder product. In some applications, in order to obtain particular properties in the final product, it may be desirable to use a solution of two different polyisocyanates as the polymerizing agent.

The manner in which the di- or polyisocyanate should be mixed with the vulcanized oil or other hydroxyl-containing vulcanizate depends upon the form of the oil and the form of the di- or polyisocyanate. In the case of fully vulcanized oils in the form of an elastic solid, the vulcanized oil is comminuted in a mill or other grinding device. The resulting powder can then be mechanically mixed with the di- or polyisocyanates either as such or in solution. This results in vulcanized oil powder, which while outwardly resembling the original vulcanized oil powder is considerably harder and dryer. The solid vulcanized oil may also be put in solution by grinding or shredding and mixing it with an organic solvent. A small percentage of a basic, nitgrogenous substance may be vulcanized oil after the addition of the diisocyanate it seems to aid the reaction.

Example III

Fifteen parts of a fully vulcanized castor oil are ground and mixed with 85 parts of a solvent blend of equal parts of toluene and methyl ethyl ketone. This mixture is brought into solution by adding a fraction of a percent of amine, as described in U.S. Patent 2,523,446. To this solution, the calculated amount of m-tolylene diisocyanate, 26 parts per 100 parts of the dry vulcanized oil content, is added and thoroughly distributed therein by stirring.

The solution is then poured on glass plates or in shallow pans. After the solvent has evaporated some additional time is allowed to make certain that the reaction between the hydroxyl groups and the isocyanate is complete. The films or sheets are then peeled off the pouring surface. The resulting films are of good physical strength, flexible, transparent and show good resistance to scratching and scuffing. They also have excellent dielectric qualities.

Example IV

A solution of fully hot vulcanized castor oil is prepared as in Example III. However, instead of being cast into films, the above solution is sprayed, brushed or applied by dipping to paper, fabric, metal, wire, wood or other surface. After drying and some additional time (approximately 24 hours total) a lacquer-like flexible coating or impregnation is obtained which shows good resistance to both water and many common organic solvents.

Example V

A solution of fully hot vulcanized castor oil is prepared as in Example III. However, instead of adding 26 parts of m-tolylene diisocyanate per 100 parts of vulcanized oil, approximately 37.5 parts of diphenyl methane diisocyanate per 100 parts of vulcanized oil are added in a 20% solution in toluene. The products formed are very similar to those disclosed in Examples III and IV.

Example VI 100 parts of castor oil are blended with 25 parts of toluene and 25 parts of methyl isobutyl ketone. 15 parts of sulphur chloride are added in small portions at intervals to the oil-solvent mixture taking care that the mixture will not heat excessively at any time. A small portion of a neutralizer like 0.5 part of magnesium oxide or a fraction of a percent of an amine may be added prior to the addition of sulphur chloride in order to neutralize hydrochloric acid formed during the reaction. Approximately 30 parts of diphenyl methane diisocyanate dissolved in 120 parts of toluol are stirred into the reaction product. The resulting viscous liquid can be cast in sheets or used as a dipping or coating compound. After evaporation of the solvent, the resulting sheets or coatings are heated for two hours at 80° C. A strong flexible, transparent coating or film of light yellow color results.

Example VII 100 parts of linseed oil which has been chemically treated to introduce hydroxyl groups into the molecules is heated with twelve parts of sulphur until a substantially thickened viscous or gelatinous product is obtained. Then parts of the vulcanized product are dissolved in 25 parts of a solvent mixture of 50 parts toluene and 50 parts methyl ethyl ketone and then thoroughly mixed with two parts of m-tolylene diisocyanate and the mixture cast as film or applied as in previous examples.

Example VIII 100 parts of castor oil are heated with eight parts of sulphur until a very viscous but still liquid semi-vulcanized oil is obtained.

100 parts of this product are mixed with 26 parts of m-tolylene diisocyanate and poured immediately into a mold of the desired shape.

After the molded mass has solidified, with or without the application of moderate heat, it is removed from the mold. The molded product is hard but does not break on impact. It can be drilled, sawed, filed or otherwise machined.

Instead of being poured into molds, the same mixture can be poured on a flat surface to obtain smooth sheets of considerable thickness.

Example IX

A liquid solution of semi-vulcanized oil is prepared as in Example VIII.

Five parts of water are stirred into 100 parts of the semi-vulcanized oil until thoroughly distributed therein. 26 parts of m-tolylene diisocyanate are subsequently stirred into the mixture, which is then applied as in Example VIII. A fairly strong, flexible, spongy product is obtained in this manner.

Example X

A solution of fully hot vulcanized castor oil is prepared as in Example III. To this solution 37 parts of triphenyl methane triisocyanate in a 20% solution in methylene dichloride are added to 100 parts of fully vulcanized oil in solution, or to an equal amount of semi-vulcanized oil. The resulting products, while somewhat less flexible than the ones obtained by the use of diisocyanates, are even more resistant to various types of organic solvents.

Example XI

A pentaerythritol tetra ricinoleate is prepared by heating together 500 parts of ricinoleic acid and 60 parts of pentaerythritol to approximately 200° C. until esterification is substantially complete. This is indicated by a test for free fatty acid, which should be below 10%.

100 parts of this ester are heated under stirring with 8–10 parts of sulphur to 150–160° C. until the mixture solidifies.

25 parts of the resulting solidified material are dissolved in 100 parts of a blend of equal parts of methyl isobutyl ketone and xylene. 6.5 parts of tolylene diisocyanate are mixed with the solution which can then be cast in sheets or applied as a coating.

A few hours heating to a moderately elevated temperature (70° C.) will assist in removing the solvent and as well as aid the formation of a dry, flexible film or coating.

It will be noted that final properties of the product depend upon two factors. One is the degree of vulcanization, that is, whether it is fully or only partially vulcanized. The other major factor is the amount and type of di- or polyisocyanate which is added. If less than an amount necessary to react all the hydroxyl groups present is added, the resulting material will be more rubbery and less hard. If more polyisocyanate is added than is necessary to react all the hydroxyl groups the resulting product will be very dry and very hard. Thus there is an opportunity to control the properties of the final product at two stages: when it is vulcanized and when the isocyanate is added.

Example XII 100 parts of castor oil are mixed with 100 parts of raw linseed oil and 100 parts of toluol. The solvent serves the purpose of slowing down the later exothermic vulcanization reaction as well as preventing gelling of the finished vulcanizate. 25 parts of sulphur monochloride are then added gradually to the mixture, if necessary under cooling, and the stirring continued until the reaction is completed.

10 parts of tolylene diisocyanate are then added and mixed into 100 parts of the above solution. (This amount of isocyanate corresponds to 14.5% of the non-volatiles in the solution, or 28.9% on the vulcanized hydroxyl-oil portion.) The co-vulcanized oils and the diisocyanate are then applied as a coating on any surface by dipping, brushing or spraying. After the solvent has evaporated, a uniform solid coating results which will further dry and harden on exposure to atmospheric conditions, especially sunlight. The hardening of the coatings is speeded up by heating to moderate elevated temperatures in the range of 80–100° C. It can also be speeded up by adding to the solution before application catalysts such as tertiary amines, or catalyst-driers like cobalt or lead naphthenate.

*Example XIII*

A mixture of 25 parts of castor oil and 75 parts linseed oil, diluted with 50 parts of toluol, together with 1.5 parts of an aliphatic amine neutralizer are cold vulcanized with 12 parts of sulphur monochloride.

50 parts of this vulcanized solution are mixed with 6 parts of tolylene diisocyanate and .005 cobalt and .05 lead in form of a solution of their naphthenates, added as a catalyst-drier.

The resulting mixture is cast on a glass plate where it sets shortly after the solution evaporates. Then the glass plate and film are exposed to the outside atmosphere. After a few days a hard and flexible film is formed and may be removed from the glass plate to provide a transparent strong, flexible, hardsurfaced self-supporting sheet.

To another 50 parts of the same solution 8 parts of tolylene diisocyanate, representing a larger excess, are added. No catalyst is used in this case. The resulting solution, forming an isocyanate adduct, will remain liquid for weeks without danger of gelation.

When the solvent is allowed to evaporate, as by application as a surface-coating, it will quickly solidify and gradually convert to an extremely hard, transparent coating which will adhere tenaciously to its base.

*Example XIV*

60 parts of diethylene glycol ricinoleate and 40 parts of raw linseed oil are mixed with 50 parts toluol and subjected to cold vulcanization under the conditions described in Example XII by the addition of 15 parts of sulphur monochloride. 20 parts of tolylene diisocyanate with 100 parts of above solution gives an extremely hard, flexible, scratch-proof film or coating after the solvent has evaporated and the reaction between the co-vulcanizate and the isocyanate has been completed by aging or atmospheric exposure. (The percentages of isocyanate in this case are 28.6% on the non-volatile portion, meaning the straight co-vulcanized oils, or 47.8% on the vulcanized hydroxy containing portion.) A mixture using only half of the above amount of isocyanate also gives a solid product or coating which, however, is softer and less strong.

*Example XV*

In this example castor oil is co-vulcanized with a synthetic unsaturated fatty acid ester. The fatty acid ester was made by esterifying fatty acids derived from tall oil (Hercules Powder PAMAC 1) with the equivalent amount of polyhydric alcohols. The polyrydric alcohols used for this synthetic ester consisted of 60% glycerol and 40% pentaerythritol. The mixture of 100 parts of caster oil and 100 parts of the above described synthetic ester is diluted with 100 parts of toluol and 2% of an aliphatic amine added as a neutralizer which acts as an acid acceptor for traces of hydrochloric acid formed during the rection. Any other suitable basic neutralizer whether inorganic or organic, as for instance magnesium oxide or triethanolamine, can be used for this purpose. The above mixture is cold co-vulcanized with 24 parts of sulphur monochloride. To 100 parts of above solution 8 parts of tolylene diisocyanate was added in one case and 16 parts in another. (8 parts of tolylene diisocyanate are equivalent to approximately 12% on the total non-volatiles or 24% on the vulcanized castor oil portion.) The resulting solutions were then poured on glass plates where they solidified on evaporation of the solvent and further hardened on aging. The mixture containing the smaller percentage of diisocyanate on removal from the glass plate yielded a soft, flexible, transparent, rubbery sheet. The mixture with the higher percentage of diisocyanate gave a sheet which is considerably harder, scratch-resistant, but is still flexible.

*Example XVI*

100 parts of a mixture of equal proportions of castor oil and fish oil (menhaden) are heated with the addition of 15 parts of sulphur under stirring to vulcanization temperature (appr. 150° C.) until the sulphur is combined and the finished product is a substantially thickened viscous semi-vulcanized oil.

100 parts of the above vulcanizate are mixed with 25 parts of polymethylene polyphenyl polyisocyanate (PAPI from the Carwin Company) and the resulting mixture is cast into a mold. A solid, flexible, rubbery molded product results. This type of material, since it contains no solvent, can be used for molding or potting compounds or it can of course be diluted with solvent and applied as surface coating as described in the above examples. The amount of polyisocyanate used in this case is 25% on the solids or 50% on the sulphurized hydroxyl-containing oils portion.

*Example XVII*

1000 parts of castor oil and 500 parts of diethylene glycol ester of rosin (Hercules Powder Company's Flexalyn) are cooked with 180 parts of sulphur for approximately 3 hours at 155–160° C. At the end of this period the sulphur is substantially combined and a heavy viscous liquid vulcanizate results. 100 parts of this vulcanizate are mixed with 8 parts of tolylene diisocyanate and the mixture is poured into a mold. After the reaction with the isocyanate is completed the sample can be removed from the mold and is a soft, rubbery, molded product. If 12 parts of tolylene diisocyanate are used instead of 8 parts, the resulting molded product will be a harder but still flexible and elastic casting. The amounts of tolylene diisocyanate used correspond to 12% of the vulcanized castor oil in the first case and to 18% of the vulcanized castor oil in the second case. The same vulcanizate can be diluted with xylol or other suitable solvents and used for coatings or as cast sheets which will be transparent and flexible and have an excellent scuff-resistant surface.

*Example XVIII*

100 parts of castor oil are mixed with 50 parts of Hercules Powder Company's Polypale Ester No. 1 (an ethylene glycol ester of polymerized rosin) and 75 parts of methyl isobutyl ketone. This mixture is then cold vulcanized with the addition of 15 parts of sulphur monochloride. For the isocyanate cross linking 100 parts of the above solution are mixed with a third of its weight of Mobay's Mondur CB-60 (which is a 60% solvent solution of a reaction product of trimethylolpropane and tolylene diisocyanate, representing a nontoxic triisocyanate). Calculated as active triisocyanate this corresponds to 20 parts of polyisocyanate on 100 parts of vulcanized compound solution equal to 29.1% of Mondur CB on the vulcanized solids, or 43.6% on the vulcanized castor oil portion. This is less than 70% of the isocyanate required for all available OH groups. The resulting coating, or sheet, after solvent evaporation and completion of the reaction at room temperature is a transparent flexible material with very good strength and surface properties.

*Example XIX*

100 parts of castor oil, 50 parts CTLA Polymer (aromatic type olefinic hydrocarbon from Enjay Company)

are cold vulcanized in a solution of 75 parts of toluol by the addition of 18 parts of sulphur monochloride under the previous described conditions. 100 parts of the resulting vulcanizate solution are mixed with 10 parts of tolylene diisocyanate and applied as a coating. The percentage of tolylene diisocyanate used in this example is 14.5% on all non-volatiles and 21.7% on the vulcanized castor oil portion, which is lower than the equivalent amount required to react with all available hydroxyl groups. After solvent evaporation the coated product is heated for 2–3 hours to a moderately elevated temperature such as 80–100° C. The resulting coating is a black, soft and very flexible material. If the amount of isocyanate is doubled a much harder but still flexible product of plastic appearance results. In between these two proportions of diisocyanate any desirable hardness can be obtained.

*Example XX*

1000 parts of pentaerythritol tetra ricinoleate (sold commercially as Flexricin 19 by the Baker Castor Oil Company) are mixed with 2000 parts of Ethyl Hydropolymer oil (a polyunsaturated petroleum derivative obtained by the polymerization of alicyclic fractions of petroleum and sold by the Ethyl Corporation) and hot vulcanized with 750 parts of sulphur added gradually to the vulcanizing mixture in increments. After all the sulphur has been combined a viscous semi-vulcanized oil is obtained. 100 parts of the resulting product is mixed with 18 parts of polymethylene polyphenyl polyisocyanate (PAPI) from the Carwin Co. The mixture is cast into a mold where it will solidify within a short time at room temperature. The resulting casting after being removed from the mold is a hard, strong solid which however still has a certain amount of flexibility and is practically shatterproof.

*Example XXI*

50 parts of castor oil are mixed with 50 parts of liquid butadiene acrylonitrile copolymer (Hycar 1312 from Goodrich Chemical Company) and cold vulcanized in the presence of toluol with 12 parts of sulphur chloride. The resulting co-vulcanized product is diluted with addition of toluol to a 50% solids solution and passed through a strainer to remove possible particles as well as bubbles. 100 parts of this solution mixed with 10 parts of tolylene diisocyanate yields after drying a strong flexible sheet which is in appearance and behaviour somewhere between a rubber and a plastic sheet. The isocyanate proportion in this case is approximately 20% on the solids and approximately 40% on the vulcanized castor oil portion.

*Example XXII*

315 parts of castor oil are hot vulcanized with 35 parts of sulphur until the sulphur is substantially combined. To the still liquid hot mixture 350 parts of Thiokol LP–2, a liquid polysulfide polymer from the Thiokol Corp., are added and cooking continued until a completely uniform product is obtained. 100 parts of the above compound are diluted with 20 parts of toluol to make for better fluidity, and reacted with 20 parts of tolylene diisocyanate. After the product has dried and the reaction is completed a solid product results which, while it has limited tensile strength, is extremely solvent resistant and suitable for purposes where solvent resistance is the chief requirement.

*Example XXIII*

1000 parts of fatty acids (mostly consisting of oleic and linoleic acids) derived from tall oil ("Unitol ACD" from Union Bag Camp Paper Corp.) are esterified with 240 parts of glycerol.

The amount of glycerol used in this esterification is twice that required to combine with all fatty acids to form triglyceride. Consequently, the resulting ester consists mostly of mono- and diglycerides (even though a small portion of triglycerides may also be formed).

The monoglycerides will have two residual hydroxy groups left in the molecule, while the diglycerides will have one residual hydroxy group.

To 100 parts of this ester 1–2% of an aliphatic amine are added to act as neutralizer for the acid by-products of the cold vulcanization process. Then 15 parts of sulphur monochloride are added gradually under cooling, resulting in a viscous cold vulcanized product.

15–18 parts of tolylene diisocyanate are mixed and reacted with 100 parts of this vulcanized ester and cast on a smooth surface. A solid transparent flexible sheet of good hardness results.

If the same partial ester is treated with the same amount of tolylene diisocyanate without prior vulcanization and applied the same way on a glass plate the reaction product is a tacky mass somewhere between a very viscous liquid and soft gel.

*Example XXIV*

A partial linseed fatty acid pentaerythritol ester is prepared by esterifying 2 mols (560 parts) of linseed oil fatty acids with 1 mol (136 parts) of pentaerythritol.

Since pentaerythritol is a tetrahydric alcohol the resulting ester, or a major proportion thereof, can be considered a di-ester, with an average of two unesterified hydroxyl groups per molecule.

1000 parts of this ester are mixed with 500 parts of soyabean oil and hot vulcanized by heating, under stirring, with 225 parts of sulphur until the sulphur is combined and the vulcanizate is very viscous or just barely gelled on cooling.

100 parts of this vulcanizate are diluted with 25 parts of benzene and 30 parts of 3,3', bitolylene 4,4' diisocyanate (National Aniline's NAcconate 200) dissolved in benzene are mixed into it.

Short, moderate heating may be required to assist in getting a uniform distribution of this diisocyanate in the vulcanizate solution.

On evaporation of the solvent a resinous coating is obtained, which can be further hardened by a few hours heating to 80–100° C.

If 100 parts of the same vulcanizate are diluted with 50 parts of methyl isobutyl ketone and mixed with 85 parts of Mondur CB–60 (a 60% solution of the triisocyanate described in Example XVIII), a softer and more flexible coating is obtained.

*Example XXV*

2 mols of linseed oil fatty acid are esterified with 1 mol of sorbitol.

While sorbitol is a hexahydric alcohol, 2 of the hydroxyl groups frequently combine with the elimination of water to form a sorbitan, leaving only four hydroxyl groups available for esterification.

While the resulting ester may theoretically contain mono, di, tri, tetra, penta and hexa esters of the fatty acids, the prevailing result obtained from the above proportions of ingredients can be presumed to be a di-ester with two or more free hydroxyl groups per ester.

100 parts of this ester are dissolved in 100 parts of toluol, 2 parts of magnesium oxide added as neutralizer, and the mixture cold vulcanized with 12 parts of sulphur monochloride.

100 parts of the vulcanizate solution are mixed with 10 parts of tolylene diisocyanate and the mixture used as a coating solution.

After evaporation of the solvent and an additional short heating period (1–2 hours at 80–100° C.) a solid coating of limited strength, but of good color, soft and elastic is obtained.

*Example XXVI*

445 parts of ricinoleic acid (approx. 1.5 mols) and 420 parts of fatty acids derived from tall oil (also approx. 1.5 mols) are esterified with 120–125 parts (approx. 1 mol) of trimethylol ethane.

100 parts of the resulting ester are cold vulcanized with 12 parts sulphur monochloride in the presence of 50 parts of toluol.

The vulcanizate solution is mixed with 15 parts of tolylene diisocyanate and applied as a coating.

Throughout the specification the expression "di- or polyisocyanates" has been used herein to conform with accepted chemical nomemclature. However, where in the specification and claims "polyisocyanate" is used alone it is interpreted to include the diisocyanates.

My invention thus comprises the reaction of one of the polyisocyanates with a polyhydroxy vulcanizate prepared from the vulcanization of hydroxy, vulcanizably unsaturated compounds either alone, in mixture, or in the presence of non-hydroxy, vulcanizably unsaturated compounds. It includes not only the products themselves but also the method of preparing these products, as illustrated in the examples.

It will thus be seen that the objects set forth above, among those made apparent from the preceding description, are efficiently attained and, since certain changes may be made in carrying out the above method and in the composition set forth without departing from the scope of the invention, it is intended that all matters contained in the above description shall be interpreted as illustrative and not in a limiting sense. Particularly, it is to be understood that the claimed ingredients or compounds recited therein in the singular are intended to include compatible mixtures of such ingredients wherever the sense permits.

I claim:

1. A method of preparing an organic plastic material which comprises causing an organic polyisocyanate having a plurality of carbon-bonded isocyanate groups per molecule to react with an organic vulcanizate containing a plurality of reactive, aliphatic carbon-bonded hydroxyl groups per molecule.

2. A method of preparing an organic plastic material which comprises causing an organic polyisocyanate having a plurality of carbon-bonded isocyanate groups per molecule to react with an organic vulcanizate containing a plurality of reactive, aliphatic carbon-bonded hydroxyl groups per molecule, said vulcanizate containing as one of the initial vulcanizable reactants thereof, an unsaturated organic ester of a higher straight chain fatty acid and a polyhydric alcohol containing a plurality of aliphatic carbon-bonded hydroxyl groups per molecule.

3. A method of preparing an organic plastic material which comprises causing an organic polyisocyanate having a plurality of carbon-bonded isocyanate groups per molecule to react with an organic vulcanizate, said vulcanizate containing as one of the initial vulcanizable reactants thereof, a hydroxyl containing unsaturated organic ester of a higher straight chain fatty acid and a polyhydric alcohol containing a plurality of aliphatic carbon-bonded hydroxyl groups per molecule.

4. A method of preparing an organic plastic material which comprises causing an organic polyisocyanate having a plurality of carbon-bonded isocyanate groups per molecule as its sole reactive groups to react with an organic vulcanizate containing a plurality of reactive, aliphatic carbon-bonded hydroxyl groups per molecule, said vulcanizate containing as one of the initial vulcanizable reactants thereof, an unsaturated organic ester of a higher straight chain fatty acid and a polyhydric alcohol containing a plurality of aliphatic carbon-bonded groups per molecule.

5. A method of preparing an organic plastic material which comprises causing an organic polyisocyanate having a plurality of carbon-bonded isocyanate groups per molecule as its sole reactive groups to react with an organic vulcanizate, said vulcanizate containing as one of the initial vulcanizable reactants thereof, a hydroxyl containing unsaturated organic ester of a higher straight chain fatty acid and a polyhydric alcohol containing a plurality of aliphatic carbon-bonded hydroxyl groups per molecule.

6. A method of preparing an organic plastic material which comprises causing an organic polyisocyanate having a plurality of carbon-bonded isocyanate groups per molecule to react with an organic vulcanizate containing a plurality of reactive, aliphatic carbon-bonded hydroxyl groups per molecule, said vulcanizate containing as one of the initial vulcanizable reactants thereof, an unsaturated organic ester of a higher straight chain fatty acid and a polyhydric alcohol containing a plurality of aliphatic carbon-bonded hydroxyl groups per molecule and as a second initial vulcanizable reactant a vulcanizable aliphatically unsaturated non-hydroxyl containing organic compound.

7. A method of preparing an organic plastic material which comprises, in combination, the steps of vulcanizing an aliphatic polyhydric alcohol ester of a straight chain unsaturated hydroxyl-containing higher fatty acid, and mixing said vulcanized ester with an organic polyisocyanate having a plurality of isocyanate groups per molecule as its sole reactive groups.

8. A method of preparing an organic plastic material which comprises, in combination, the steps of vulcanizing a non-linear ester of ricinoleic acid and an aliphatic polyhydric alcohol, and mixing said ester with an organic polyisocyanate having a plurality of isocyanate groups per molecule as its sole reactive groups.

9. A method of preparing an organic plastic material which comprises, in combination, the steps of vulcanizing castor oil and mixing said vulcanized castor oil with an organic polyisocyanate having a plurality of isocyanate groups per molecule as its sole reactive groups.

10. A method of preparing an organic plastic material which comprises, in combination, the steps of vulcanizing an aliphatic polyhydric alcohol ester of an hydroxylated straight chain unsaturated higher fatty acid, and mixing said vulcanized ester with an organic polyisocyanate having a plurality of isocyanate groups per molecule as its sole reactive groups.

11. A method of making an organic plastic material which comprises, in combination, the steps of partially vulcanizing an aliphatic polyhydric alcohol ester of a straight chain unsaturated hydroxyl-containing higher fatty acid until it becomes a viscous liquid, and mixing said liquid with an organic polyisocyanate having a plurality of isocyanate groups per molecule as its sole reacting groups, to thereby form said material.

12. The method defined in claim 11 in which said ester is castor oil.

13. A method of making an organic plastic material which comprises, in combination, the steps of cold vulcanizing an aliphatic polyhydric alcohol ester of a straight chain unsaturated hydroxyl-containing higher fatty acid with sulfur chloride, and mixing said vulcanized ester with an organic polyisocyanate having a plurality of isocyanate groups per molecule as its sole reactive groups.

14. The method defined in claim 13 in which said ester is castor oil.

15. The method of making an organic plastic material which comprises, in combination, the steps of hot vulcanizing an aliphatic polyhydric alcohol ester of a straight chain unsaturated hydroxyl-containing higher fatty acid and mixing said vulcanized ester with an organic polyisocyanate having a plurality of isocyanate groups per molecule as its sole reactive groups.

16. The method defined in claim 15 in which said ester is castor oil.

17. The method defined in claim 15 in which said ester is castor oil, and vulcanization is continued until a solid product is obtained, and said solid product is placed in solution before mixing with said organic polyisocyanate.

18. A method of preparing an organic plastic material which comprises causing an organic polyisocyanate having a plurality of carbon-bonded isocyanate groups per molecule as its sole reactive groups to react with an organic vulcanizate containing a plurality of reactive, aliphatic carbon-bonded hydroxyl groups per molecule, said vulcanizate including as the sole initial vulcanizable reactant thereof an aliphatic polyhydric alcohol partial ester of a straight chain unsaturated fatty acid.

19. A method of preparing an organic plastic material which comprises causing an organic polyisocyanate having a plurality of carbon-bonded isocyanate groups per molecule as its sole reactive groups to react with an organic vulcanizate containing a plurality of reactive, aliphatic carbon-bonded hydroxyl groups per molecule, said vulcanizate including as one of the initial vulcanizable reactants thereof, an unsaturated organic ester of a higher straight chain fatty acid and a polyhydric alcohol containing a plurality of aliphatic carbon-bonded groups per molecule, and as another of the initial vulcanizable reactants thereof, a non-hydroxyl containing aliphatically unsaturated organic compound selected from the group consisting of a polyhydric aliphatic alcohol ester of a straight chain unsaturated higher fatty acid, a polyhydric aliphatic alcohol ester of an unsaturated rosin acid, a polyhydric aliphatic alcohol ester of a polymerized unsaturated rosin acid, a high molecular weight poly-unsaturated polymerized petroleum distillation product containing a plurality of aliphatically unsaturated groups per molecule, a synthetic butadiene polymer, and a synthetic organic polysulfide polymer.

20. An organic plastic material produced by the process set forth in claim 1.

References Cited in the file of this patent
UNITED STATES PATENTS

| | | |
|---|---|---|
| 2,422,049 | Stamberger | June 10, 1947 |
| 2,424,884 | Cook | July 29, 1947 |
| 2,523,446 | Posnansky | Sept. 26, 1950 |
| 2,633,458 | Shokal | Mar. 31, 1953 |
| 2,766,164 | Salem | Oct. 9, 1956 |
| 2,787,601 | Detrick et al. | Apr. 2, 1957 |